United States Patent
Lutz et al.

(10) Patent No.: US 6,779,418 B2
(45) Date of Patent: Aug. 24, 2004

(54) METHOD FOR DETERMINATION OF CHARACTERISTICS OF A TRANSMISSION

(75) Inventors: Otto Lutz, Mexersburg (DE); Markus Eisele, Friedrichshafen (DE); Harry Nolzen, Tettnang (DE); Torsten Buchner, Friedrichshafen (DE)

(73) Assignee: ZF Friedrichshafen AG (DE)

( * ) Notice: Subject to any disclaimer, the term of this patent is extended or adjusted under 35 U.S.C. 154(b) by 0 days.

(21) Appl. No.: 10/439,747

(22) Filed: May 16, 2003

(65) Prior Publication Data

US 2004/0009840 A1 Jan. 15, 2004

(30) Foreign Application Priority Data

Jul. 15, 2002 (DE) ........................................ 102 31 820

(51) Int. Cl.⁷ .............................................. F16H 59/00
(52) U.S. Cl. ........................................ 74/335; 475/116
(58) Field of Search ............................ 74/335; 475/116

(56) References Cited

U.S. PATENT DOCUMENTS 5,551,930 A * 9/1996 Creger et al. ............... 477/130
5,809,442 A * 9/1998 Schulz et al. .................. 701/51

FOREIGN PATENT DOCUMENTS

| DE | 197 44 697 A1 | 4/1999 |
|----|---------------|--------|
| EP | 0 859 171 A1 | 8/1998 |

OTHER PUBLICATIONS

German Search Report

* cited by examiner

*Primary Examiner*—Dirk Wright
(74) *Attorney, Agent, or Firm*—Milde & Hoffberg, LLP

(57) ABSTRACT

A method for determining characteristic parameter values within a transmission that includes, for example, hydraulically-operated shifting elements, hydro-dynamic brakes, and hydro-dynamic torque converters. Slip regulation is used to determine the actual slip at a transmission element, whose characteristic parameter values are to be determined, before engagement. This element to be adapted is activated by means of pressure application, and thus a specified slip is set that is clearly different from the actual slip at lower torques. The applied pressure or flow may be determined from the set slip, and occurrence of a set slip allows the occurring pressures to be determined.

6 Claims, 1 Drawing Sheet

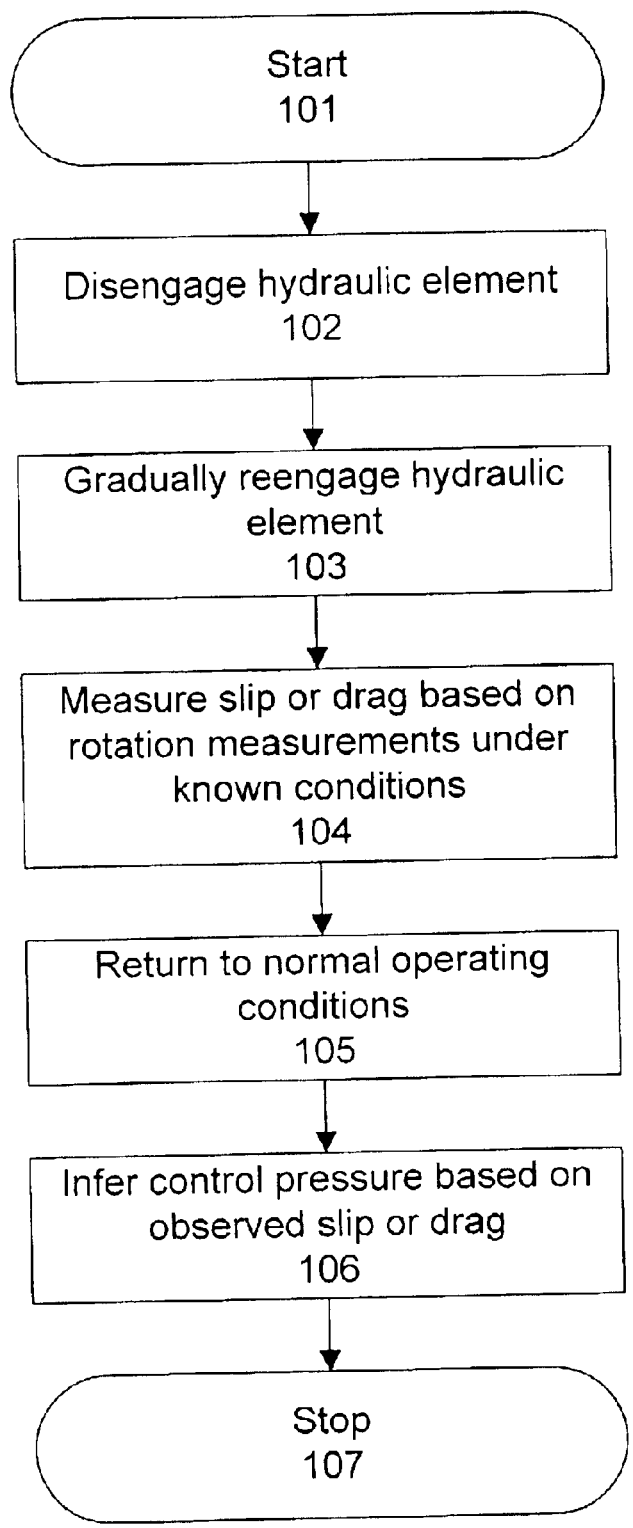
Figure

METHOD FOR DETERMINATION OF CHARACTERISTICS OF A TRANSMISSION

FIELD OF THE INVENTION

The present invention relates to the field of automatic transmission control, and more particularly a method for determining characteristic parameter values within a transmission

BACKGROUND OF THE INVENTION

Procedures are known to determine characteristic parameter values within a transmission for a large number of applications. An important one of these procedures is, for example, the determination of the contact conditions of hydraulic shifting elements during a shift under load. Reliable filling of the shifting elements during actuation is thus an important pre-requisite to ensuring good shift quality. If temporal deviations arise during the filling of shifting elements, i.e., the filling takes too long or is too short, this may lead to tensions or undesired rotational speed deviations in the vehicle engine. The results of these temporal deviations may be a drop in vehicle engine torque, reduction of shift quality, or an increase of loads applied to the shifting elements. The contact forces of the shifting elements are normally applied in a fixed manner.

When a torque-converter lockup clutch is used as a shifting element, determination of contact of the torque-converter lockup clutch with the inner wall of the piston is made by calculation of an internal pressure in the converter, which is strongly dependent on the operating point. This serves as the base pressure for the contact pressure of the shifting elements. Determination of the internal pressure in the converter is also known. This may be determined, for example, using an expensive system including telemetric measurement equipment. Further, transmission-specific contact pressures in the shifting elements may be determined with the use of iterative processes.

U.S. Pat. No. 6,322,517 (equivalent to DE 197 44 697 A1), expressly incorporated herein by reference, describes a procedure for adapting operation of a torque-converter lockup clutch of an automatic transmission, in which an electronic transmission control system provides a reaction (due to contact pressure) upon recognition of the demand for an alteration of condition of the torque-converter lockup, whereby an alteration of condition is initiated during a control/regulation phase, and the electronic transmission control system recognizes a reaction of the torque-converter lockup by means of reported parameter values, and thus determines an adaptation value for the contact pressure. After output of the contact pressure, a contact phase results for the torque-converter lockup, during which the electronic transmission control system initiates a pressure alteration, after a transition function within a first time interval, and checks for the presence of the reaction in the torque-converter lockup. If no reaction follows, additional time intervals are issued. The contact phase is ended when a reaction from the torque-converter lockup follows.

The procedure known from the state of the art to determine parameter values within a transmission has a disadvantage in that it does not recognize the beginning of the torque increase during activation of a brake. If the brake is activated in such a system, it is not possible to determine the exact control pressure at which the brake creates a detectable braking moment. Recognition of the point in time at which the brake creates an initial moment would be an advantage for the control of an automatic transmission, especially if brake management systems are installed in the vehicle. The sample scattering during filling of the shifting elements cannot be compensated by the known procedure, which means a high adaptation cost. Iterative procedures to determine transmission-specific contact pressures of the shifting elements require a large number of confirmation samplings, which are time- and cost-intensive to implement. A model-specific determination of these characteristic parameter values for the control of a transmission based on the state of the art is not possible. Thus, expensive experimentation and adaptations must be performed.

SUMMARY OF THE INVENTION

It is therefore an object of the present invention to provide a method which allows the determination of several transmission-specific characteristic parameter values such as various pressures, forces, and moments. Further, the invention proposes cost effective means for such determination procedures.

The task facing the invention is solved by a generic procedure to determine characteristic parameter values of a transmission, for example a transmission that includes, for example, hydraulically-operated shifting elements, hydro-dynamic brakes, and hydro-dynamic torque converters, by means of slip regulation in which the actual slip at a transmission element whose characteristic parameter values are to be determined, is determined before engagement.

Using slip regulation, contact pressures of shifting elements, internal converter pressure, and brake initiation behavior, i.e., the initiation of torque increase upon actuation of the brake, may be determined. In a suitable phase, during quasi-static conditions, constant acceleration, delays, or cessations, for example, the actual slip with respect to the shifting element to be adapted is determined before engagement. The element to be adapted, such as a shifting element, brake, or torque converter, in which a pressure or a torque is to be determined adaptively, is slowly activated by application of pressure, whereby a new quasi-static condition is obtained by the control system. The slip thus arising is so selected that the difference from the unaffected system is clearly recognizable, but the required and applied torques are low. This slip reduction results from the actual slip value multiplied by a factor x. The slip reduction may be implemented in many ways. If the slip reduction is adjusted as desired, the applied pressure and/or flow may be determined, and thus related to the observed pressures and/or moments. The rotations per minute (RPM) regulators used are adapted to the dynamics of the element to be adapted.

The procedure based on the present invention may be applied in many ways. One way is for it to be automatically activated by the transmission system, either cyclically or based on recognized system deviations from a specified intended behavior. Another way would be for the user to activate the procedure by intentional input. Integration of this procedure can be directly within the transmission control device or via an external device that does not directly and/or normally belong to normal transmission equipment. Thus, the connection to the transmission may be direct or via the transmission control device.

This procedure distinguishes itself particularly by the fact that the adjustment value is found after the adaptation, and need not be determined in a costly manner by iteration. Based on the low impact on the system, the adaptation does not reduce the comfort level of driving behavior. This procedure can additionally be used to prepare for a normal shifting process. Further, the procedure based on the present invention allows the determination of contact pressures of shifting elements that are adaptively operation-point-specific, internal converter pressure, and brake initial contact behavior.

Model-specific determination of characteristic parameter values for control of an automatic transmission is no longer required, since sample scattering may be compensated by the procedure based on the present invention. Model-dependent programming and expensive adjustment processes are not required, which leads to cost savings. In addition, it is possible, through the method according to the invention, to determine the adaptive operating-point specific feed pressures of the switching elements, the internal pressure of the torque converter, as well as the deceleration initial response behavior. Further, alterations of components may be compensated over the service life by the procedure according to the present invention.

According to the invention, the transmission hydraulic element to be adapted is activated by means of pressure application, and thus a specified slip is set, that is clearly different from the actual slip at lower torques. The applied pressure or flow in this state may be determined from the set slip, from which in turn the occurring pressures may be determined. Thus, in relatively simple manner, a measurement of slip, based on differential rotation of elements, may be used to adaptively control the transmission and establish desired operating points.

Accordingly, the contact pressures of clutches and brakes may be determined by means of regulation of the slip. Regulation of the slip may be used to determine internal pressures within the torque converter. An initial demand pressure of the brake may be determined by means of the slip regulation. The control over the adaptive process may be integrated directly into the transmission control device, or performed by an external device.

BRIEF DESCRIPTION OF THE DRAWING

The FIGURE shows a flow chart indicating the generic steps of the method according to the present invention.

DETAILED DESCRIPTION OF THE PREFERRED EMBODIMENTS

In the following, the principle of the invention is described using several application possibilities.

A first example of the application of the procedure based on the present invention is the determination of contact pressure in hydraulic shifting elements when at rest. When the vehicle is stopped, a torque-converter lockup clutch is disengaged and the transmission clutch is engaged. By activation of a test coupling or a test braking, the torque converter turbine is slightly braked, which leads to an alteration of the slip at the transmission.

A second example of the application of the procedure based on the present invention is the determination of contact pressure of a torque-converter lockup clutch at rest. For this, with the vehicle at rest, the torque-converter lockup clutch is disengaged and two transmission clutches leading to a gear are engaged. By activation of a test coupling, the pump of the torque converter is lightly braked, which corresponds to an alteration of engine RPM.

A further example of the application of the procedure based on the present invention serves to determine the internal torque-converter pressure at a constant vehicle speed. When driving in a fixed gear, the torque-converter clutch is disengaged and the pressure is slowly applied again. This pressure is increased to the point that the desired slip alteration or a desired slip is set.

The procedure based on the present invention may further be used to determine a demand pressure of a brake at rest. With the vehicle at rest, the engine turns at the desired RPM, whereby no gear is engaged. A turbine of the torque converter and the brake rotate at almost the same speed as that of the vehicle engine. By means of a slow activation of the brake and the braking moment that arises from it, the turbine RPM are reduced to correspond to the set demand pressure of the brake.

The Figure shows a flow chart demonstrating generic aspects of the present invention. At the beginning of the process 101, a hydraulic element (or elements) is disengaged 102, and gradually reengaged 103. During reengagement, slip, drag or retardation due to a partial engagement of that element or those elements is measured 104. This measurement may analyze engine RPM, transmission component RPM, or the like. The vehicle may then be returned to normal operating conditions 105.

During use of the vehicle, a pressure or condition within the transmission may then be inferred 106 based on the slip, drag or retardation observed. That is, in order to control the pressure within an actuator element according to functional criteria, the slip is measured, which, in turn, infers the pressure or fill applied to the hydraulic actuator. This allows relatively simple and possibly preexisting sensors to be employed, in order to provide control over the transmission elements around an operating point where pressure changes in the actuator are relatively linear with changes in volume. Thus, the use of abrupt pressure changes as a control variable is avoided, with a relatively simple measurement of the initiation of detectable braking moment made available.

While the above detailed description has shown, described and pointed out the fundamental novel features of the invention as applied to various embodiments, it will be understood that various omissions and substitutions and changes in the form and details of the system and method illustrated may be made by those skilled in the art, without departing from the spirit of the invention. Consequently, the full scope of the invention should be ascertained by the appended claims.

What is claimed is:

1. A method for determining a characteristic parameter value within a transmission having a hydraulically-operated transmission element comprising the steps of disengaging the transmission element; gradually reengaging the transmission element, while measuring slip, and determining an engagement state of the transmission element corresponding to a predetermined slip, different than a slip during a disengaged state.

2. Method as in claim 1, wherein the transmission element comprises a clutch or a brake, further comprising the step of determining a contact pressure of the clutche or brake by measurement of a slip.

3. Method as in claim 1, wherein the transmission element comprises a torque converter, further comprising the step of determining an internal pressure within the torque converter based on a slip.

4. Method as in claim 1, wherein the transmission element comprises a brake, wherein an initial demand pressure of the brake is determined based on a slip measurement.

5. Method as in claim 1, wherein the transmission comprises a transmission control device, wherein the transmission control device controls the gradual engagement of the transmission element and measurement of slip.

6. Method as in claim 1, wherein the transmission comprises a transmission control device, wherein the gradual engagement of the transmission element and measurement of slip is controlled by a device external to the transmission control device.

* * * * *